US011301990B2

(12) United States Patent
Peters et al.

(10) Patent No.: US 11,301,990 B2
(45) Date of Patent: Apr. 12, 2022

(54) BORESCOPE INSPECTION METHOD AND DEVICE

(71) Applicant: Lufthansa Technik AG, Hamburg (DE)

(72) Inventors: Jan Oke Peters, Hamburg (DE); Michael Thies, Hamburg (DE); Sven Rasche, Hamburg (DE); Tomas Domaschke, Hamburg (DE); Thorsten Schueppstuhl, Hamburg (DE); Werner Neddermeyer, Echternach (LU); Soenke Bahr, Darmstadt (DE)

(73) Assignee: LUFTHANSA TECHNIK AG, Hamburg (DE)

( * ) Notice: Subject to any disclaimer, the term of this patent is extended or adjusted under 35 U.S.C. 154(b) by 0 days.

(21) Appl. No.: 17/422,451

(22) PCT Filed: Jan. 14, 2020

(86) PCT No.: PCT/EP2020/000009
§ 371 (c)(1),
(2) Date: Jul. 13, 2021

(87) PCT Pub. No.: WO2020/148085
PCT Pub. Date: Jul. 23, 2020

(65) Prior Publication Data
US 2022/0044384 A1 Feb. 10, 2022

(30) Foreign Application Priority Data
Jan. 14, 2019 (DE) .................. 10 2019 100 822.0

(51) Int. Cl.
*G06F 3/0481* (2022.01)
*G06T 7/00* (2017.01)
(Continued)

(52) U.S. Cl.
CPC ................ *G06T 7/001* (2013.01); *B64F 5/60* (2017.01); *G01N 21/954* (2013.01); *G06T 7/344* (2017.01);
(Continued)

(58) Field of Classification Search
CPC  G06T 7/001; G06T 7/344; G06T 7/70; G06T 2207/10012; G06T 2207/30164; B64F 5/60; G01N 21/954; H04N 13/239
See application file for complete search history.

(56) References Cited

U.S. PATENT DOCUMENTS 7,170,677 B1* 1/2007 Bendall ................ A61B 1/0005
348/49
2007/0132840 A1* 6/2007 Konomura ........... G01N 21/954
348/65
(Continued)

FOREIGN PATENT DOCUMENTS

DE  102011122759 A1  5/2013
EP      3264341 A1  1/2018

*Primary Examiner* — Howard D Brown, Jr.
(74) *Attorney, Agent, or Firm* — Leydig, Voit & Mayer Ltd.

(57) ABSTRACT

A method for borescope inspection of a component uses a stereo borescope for recording the component. The method includes: generating two stereoscopic partial images by means of the stereo borescope; calculating 3D triangulation data from the two stereoscopic partial images; registering the 3D triangulation data to a 3D CAD reference model of the component captured by the stereo borescope, while determining a projection point; projecting 2D image data determined from the two stereoscopic partial images onto the 3D CAD reference model from the determined projection point; and determining damage by image analysis of the projected 2D image data and by ascertaining deviations of the registered 3D triangulation data vis-à-vis the 3D CAD reference model.

11 Claims, 5 Drawing Sheets

(51) Int. Cl.
    *G01N 21/954*     (2006.01)
    *G06T 7/33*     (2017.01)
    *B64F 5/60*     (2017.01)
    *G06T 7/70*     (2017.01)
    *H04N 13/239*     (2018.01)

(52) U.S. Cl.
    CPC ...... *G06T 7/70* (2017.01); *G06T 2207/10012* (2013.01); *G06T 2207/30164* (2013.01); *H04N 13/239* (2018.05)

(56) References Cited

U.S. PATENT DOCUMENTS

| | | | |
|---|---|---|---|
| 2011/0267428 A1* | 11/2011 | George | G06T 15/30 348/46 |
| 2015/0146964 A1* | 5/2015 | Tai | G06T 19/20 382/141 |
| 2015/0346115 A1* | 12/2015 | Seibel | H04N 5/2256 348/50 |
| 2016/0178532 A1* | 6/2016 | Lim | G01N 21/9515 348/46 |
| 2018/0002039 A1* | 1/2018 | Finn | G07C 5/0808 |
| 2018/0350056 A1* | 12/2018 | Cardenas Bernal | G06T 7/001 |
| 2019/0049962 A1* | 2/2019 | Ouellette | B64C 39/024 |
| 2021/0208765 A1* | 7/2021 | Bendall | G06F 3/04815 |

\* cited by examiner

BORESCOPE INSPECTION METHOD AND DEVICE

CROSS REFERENCE TO RELATED APPLICATIONS

This application is a U.S. National Phase application under 35 U.S.C. § 371 of International Application No. PCT/EP2020/000009, filed on Jan. 14, 2020, and claims benefit to German Patent Application No. DE 10 2019 100 822.0, filed on Jan. 14, 2019. The International Application was published in German on Jul. 23, 2020 as WO 2020/148085 A1 under PCT Article 21(2).

FIELD

The invention relates to a method and a device for borescope inspection of components, in particular of turbine and/or compressor blades in a gas turbine, such as e.g. an aircraft engine.

BACKGROUND

The optical inspection of gas turbines, in particular of aircraft engines such as jet engines, may use a borescope that is inserted through a lateral opening into a fully assembled gas turbine in order in this way then to be able to optically inspect the interior of the gas turbine.

On account of the loads that occur during operation, corresponding borescopy is used in particular for the inspection of turbine and compressor blades of aircraft engines. For this purpose, a borescope is inserted laterally into the aircraft engine and positioned in the interior of the gas duct such that a blade of a turbine or compressor stage and also the connection region of the engine blade—in the case of relatively large engine blades a predefined height region of the blade surface—lies completely in the image region of the borescope. The turbine or compressor stage is then rotated, whereby all engine blades of the corresponding stage can be dynamically captured by the borescope.

The image or video recordings generated in the process are analyzed manually in order to document the structural state of the engine blades. In the event of significant damage, manual static 3D capture of an individual engine blade can be effected in order to be able to analyze the damage more accurately. However, this 3D capture is very complex and time-intensive, and so it is carried out only in exceptional cases.

SUMMARY

In an embodiment, the present disclosure provides a method for borescope inspection of a component that uses a stereo borescope for recording the component. The method includes: generating two stereoscopic partial images by means of the stereo borescope; calculating 3D triangulation data from the two stereoscopic partial images; registering the 3D triangulation data to a 3D CAD reference model of the component captured by the stereo borescope, while determining a projection point; projecting 2D image data determined from the two stereoscopic partial images onto the 3D CAD reference model from the determined projection point; and determining damage by image analysis of the projected 2D image data and by ascertaining deviations of the registered 3D triangulation data vis-à-vis the 3D CAD reference model.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
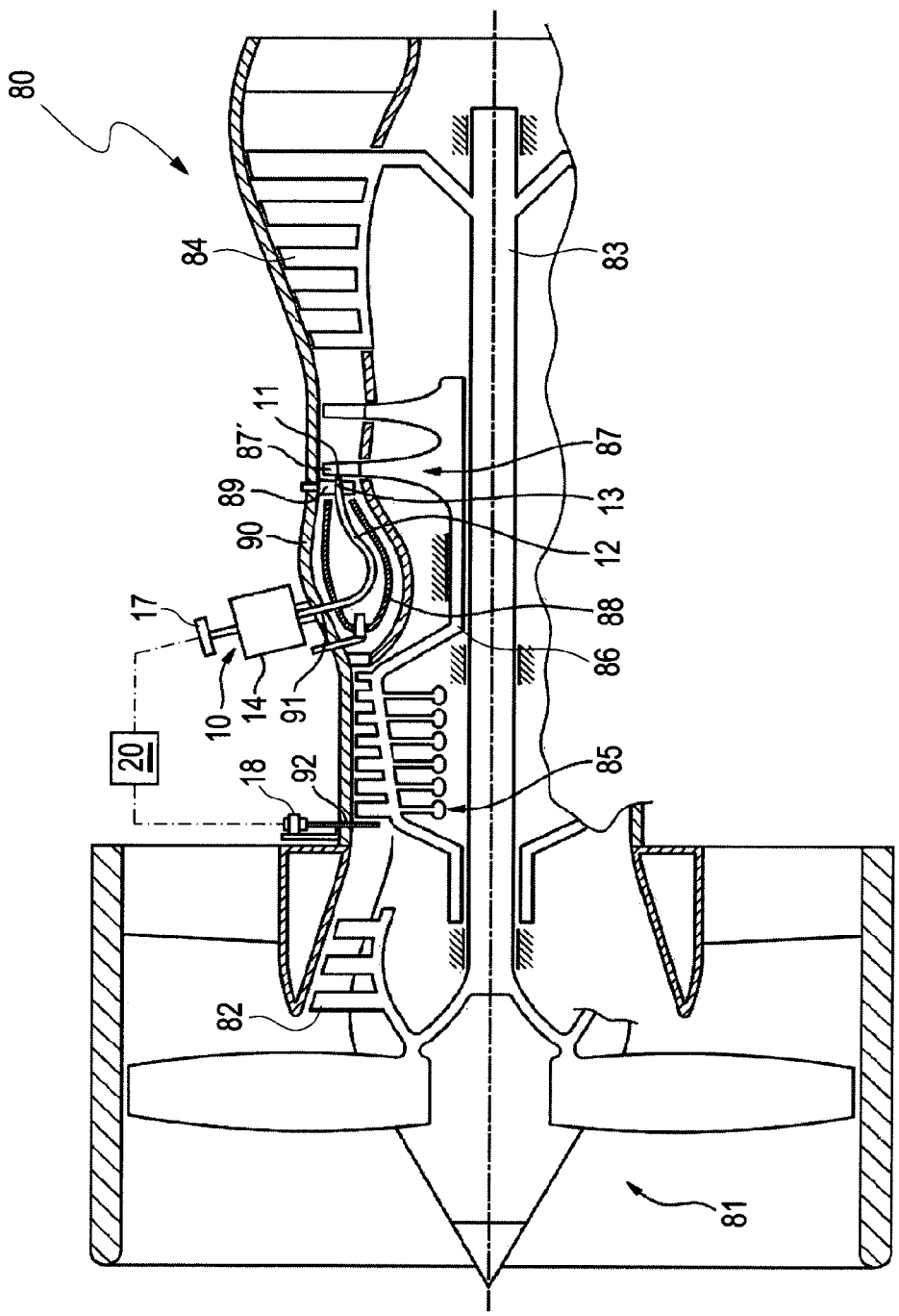
FIG. 1 shows an exemplary embodiment of a borescope inspection device according to the invention in the case of use on an aircraft engine.

Embodiments of the present invention provide a method for borescope inspection of a component and a device configured therefor, which feature improved 3D capture of surfaces in the interior of a component, in particular of an aircraft engine, and automated damage determination.

Accordingly, an embodiment of the present invention provides to a method for borescope inspection of a component, wherein a stereo borescope is used for recording the component, characterized by the following steps:

generating two stereoscopic partial images by means of the stereo borescope;

calculating 3D triangulation data from the stereoscopic partial images;

registering the 3D triangulation data to a 3D CAD reference model of the component captured by the stereo borescope, while determining a projection point;

projecting 2D image data determined from the stereoscopic partial images onto the reference model from the determined projection point; and determining damage by image analysis of the projected 2D image data and by ascertaining deviations of the registered 3D triangulation data vis-à-vis the reference model.

Furthermore, an embodiment of the present invention provides a device for borescope inspection of a component comprising a stereo borescope and, connected thereto, a computer unit having access to a memory comprising a 3D CAD reference model of the component to be inspected, wherein the device is configured for carrying out the method according to an embodiment of the invention.

Some terms used in connection with the invention will be explained first.

A "stereo borescope" is a borescope configured for stereoscopic recording. For this purpose, the stereo borescope has two image capturing units spaced apart from one another, the recording cones of which overlap in a recording plane, such that a common recording region captured by both recording cones arises in the recording plane. The result of the two image capturing units is firstly "2D image data", that is to say a grid-shaped arrangement of image points having either color information or brightness information (grayscale levels). On account of the spacing of the two image capturing units and the resultant deviating viewing angle toward the recording region, for practically every point in the recording region it is possible, with the aid of triangulation, to determine the distance from the image capturing units as "3D triangulation data". Methods suitable for this purpose are known by the term stereo vision. From the image information, together with the 3D triangulation data, it is possible to generate a 3D model of the object or image region recorded by the borescope.

The stereo borescope can be based on the principle of the "videoscope", in which the images recorded by an optical unit at the free end of the borescope are not guided via an optical line to an eyepiece or a camera at the other end of the borescope, but rather are converted into electronic image information directly at the free end with the aid of suitable semiconductor elements as image capturing units, said image information then being communicated via a data connection e.g. to a display or to a computer unit for further processing. Corresponding semiconductor elements, such as optical CCD or CMOS sensors, are known. Even further integrated circuits can be provided directly in the region of the optical semiconductor elements, which integrated circuits can carry out preprocessing of the electronic image information captured by the semiconductor elements in order that the amount of data to be transmitted via the data connection is reduced by means of data reduction, for example. Data reduction can be achieved by compression of the electronic image information originating from the semiconductor elements. It is additionally or alternatively also possible for the integrated circuit, e.g. a "Field Programmable Gate Array" (FPGA), to remove from the electronic image information those data which do not represent the final common recording region captured by both semiconductor elements. Moreover, the calculations described below, such as e.g. the determination of 3D triangulation data or generation of 2D image data, can be carried out at least partly by means of a corresponding integrated circuit. Other substeps, such as e.g. registering the 3D triangulation data to a 3D CAD model, are preferably carried out by an external computer unit, such as e.g. a computer, which obtains the data required for this from the stereo borescope via the data connection.

In a first step, the stereo borescope generates two stereoscopic partial images by virtue of the fact that the image capturing units simultaneously capture an image of the common recording region or of the component to be recorded or of a part thereof. Simultaneous capture is advantageous in order to be able directly to exclude possible temporal variations between two sequential recordings, e.g. because the component to be recorded is moved. If the image capturing units are semiconductor elements, it is preferred for the latter to be equipped with a global shutter in order to minimize the risk of motion artefacts.

If necessary, the stereoscopic partial images captured by the two image capturing units can be rectified on the basis of a predefined calibration in order possibly to compensate for distortions and/or to carry out color balancing. Corresponding rectification can simplify the subsequent calculations and/or increase the accuracy of the calculation results.

3D triangulation data are then generated from the two, optionally rectified, stereoscopic partial images. The stereo vision calculations and methods required for this are known to persons skilled and the art and do not need further explanations at this juncture. As a result, after calculation concerning a multiplicity of points in the recording region information concerning their distance with respect to the image capturing units is present.

Afterward, the 3D triangulation data are registered to a 3D CAD reference model of the component captured by the stereo borescope. For this purpose, in an automated method on the basis of the 3D triangulation data a projection point vis-à-vis the 3D CAD reference model is determined from which the 3D triangulation data best correspond to the 3D CAD reference model. By virtue of the fact that the projection point is obtained directly from the 3D triangulation data, it is possible to preclude any inaccuracies in the determination of the location of the projection point by way of a differently determined position of the stereo borescope or the image capturing units thereof. It is regularly advantageous, however, if the projection point is determined in an automated manner beginning with a position of the stereo borescope that is determinable e.g. by means of a borescope guide device. Even if this determinable position may not be exactly with the final projection point on account of measurement inaccuracies or the like, nevertheless as a rule it lies in the vicinity of the projection point sought. Subsequently, proceeding from the determinable position of the stereo borescope, the desired projection point can often be determined faster than in the case of an arbitrary starting point for determining the projection point. Moreover, the predefinition of the determinable position of the stereo borescope as a starting point in the case where a plurality of projection points are suitable, in principle, can contribute to unambiguity in the determination of the projection point. The determinable position regularly also comprises the orientation of the image capturing units of the stereo borescope.

The projection point can be determined for example by minimizing the deviations between 3D triangulation data and 3D CAD reference model by varying the projection point step by step until a desired minimum of the deviations of the individual points of the 3D triangulation data from the 3D CAD reference model is set and/or the standard deviation of these deviations is minimal.

Once the projection point has been determined, it is possible for the 3D CAD reference model subsequently to be adapted according to the 3D triangulation data. In other words, deviations that arise between the 3D triangulation data and the 3D CAD reference model, e.g. because the 3D triangulation data reveal a deformation of the recorded component, are intended to be adopted in the 3D CAD reference model in order that the latter then offers as accurate an image of the component as possible. Irrespective of whether or not the 3D CAD reference model is adapted according to the 3D triangulation data, the 2D image data are subsequently projected onto the reference model proceeding from the projection point in order thus to texture the 3D CAD reference model. One of the stereoscopic partial images can be used for this purpose. It is preferred, however, if the 2D image data are generated by the two stereoscopic partial images being superimposed with one another in order thus to reduce possible shading effects or the like. By virtue of the 2D image data being projected from the previously determined projection point, a good correspondence between the projection of the 2D image data onto the 3D model and the actual conditions of the component is achieved.

On account of the accuracy achieved according to the invention for the deviations of the 3D triangulation data vis-à-vis the 3D CAD reference model and also for the projection of the 2D image data onto the reference model, an automated determination of damage on the recorded component is finally possible. In this case, the 2D image data projected onto the 3D CAD reference model can be subjected to an image analysis that makes it possible to determine relatively small instances of damage e.g. on the basis of variations of the image data vis-à-vis a component state documented previously by means of the method according to an embodiment of the invention, or by ascertaining shadow casting e.g. in cases of cracks. Deviations of the registered 3D triangulation data from the original 3D CAD reference model or from a component state documented previously by means of the method according to and embodiment of the invention may likewise indicate damage on the component. Since these examinations are effected on the basis of the 3D CAD reference model textured by the 2D image data, an accurate localization of possible damage is possible.

In many cases a component cannot be captured by an individual recording with the stereo borescope. It is therefore preferred if a borescope guide device is provided, which enables the stereo borescope and in particular the image capturing units thereof to move in a controlled manner. Furthermore, it is preferred if said borescope guide device is controlled in such a way that all predefined regions of the component are captured sequentially by the stereo borescope, wherein the 3D triangulation data and/or 2D image data generated in each case by way of a stereoscopic partial image pair are combined with the aid of the reference model. By way of the reference model it is possible—as described—to accurately determine the projection points for registering the 3D triangulation data and/or projecting the 2D image data, such that in the case of partial overlap of 3D triangulation data and/or 2D image data of two recordings known methods, such as e.g. stitching methods, can be employed in order that the data of different recordings can be combined with high accuracy to form a single textured 3D CAD reference model.

The method according to an embodiment of the invention is particularly suitable for the borescope inspection of blades of a gas turbine, in particular of an aircraft engine. In this case, corresponding blades are combined to form ring-shaped turbine or compressor stages.

On account of the customary uniformity of the blades of a turbine or compressor stage, in general the recording of the stereo borescope by itself does not make it possible to ascertain which blade(s) of a turbine or compressor stage is/are actually situated in the recording region of the stereo borescope, for which reason the registration of the 3D triangulation data and the subsequent projection of the 2D image data onto the 3D CAD reference model are regularly not possible in an unambiguous manner. In order to counter that, it is preferred if the actual rotation angle position of the blade(s) to be recorded relative to the rotation axis of the respective stage is taken into account when registering the 3D triangulation data to the reference model. In other words, the projection point is determined with reference to the actual angle position of the compressor or turbine stage respectively recorded, such that the final registration of the 3D triangulation data and the projection of the 2D image data onto the actually recorded engine blade(s) of the 3D CAD reference model of the turbine or compressor stage are effected.

During the borescope inspection of engine blades of a turbine or compressor stage, it is preferred if the rotation angle position of the turbine or compressor blades to be recorded is controlled in such a way that all turbine or compressor blades of a turbine or compressor stage are captured. Automated capture and damage analysis of all blades of a turbine or compressor stage become possible as a result.

For explanation of the device according to an embodiment the invention, reference is made to the explanations above.

FIG. 1 shows an exemplary embodiment of a device 1 according to the invention during use for the borescope inspection of an engine 80.

The engine 80 illustrated in section is a two-shaft engine in which the fan 81 and the low-pressure compressor 82 are rotationally connected to the low-pressure turbine 84 via a first shaft 83, while the high-pressure compressor 85 is rotationally connected to the high-pressure turbine 87 via a second shaft 86. The combustion chamber 88 is arranged between high-pressure compressor 85 and high-pressure turbine 87.

Figure 2:
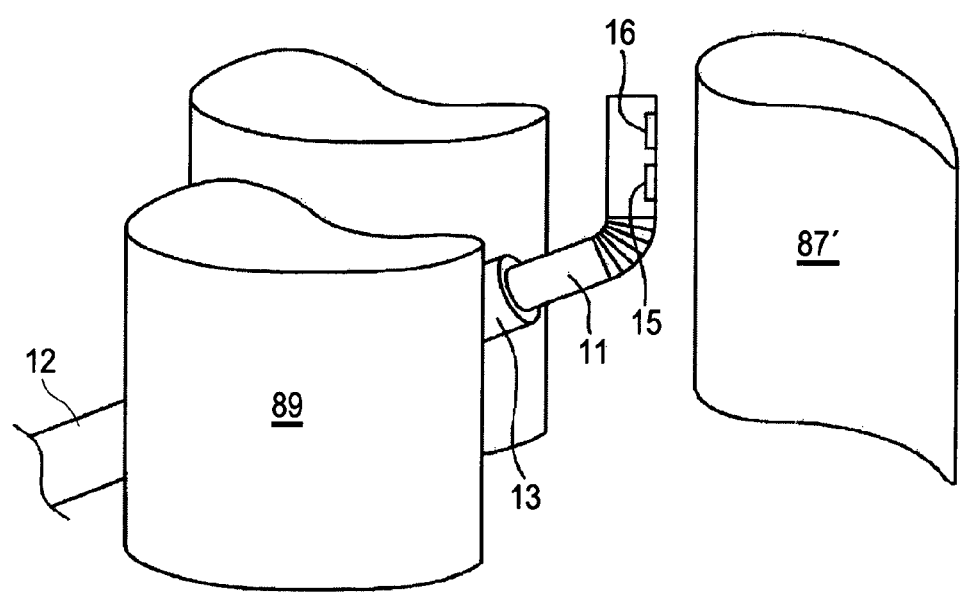
FIG. 2 shows a detail illustration concerning the device from FIG. 1.

For inspection of the turbine blades 87' of the first stage of the high-pressure turbine 87, a stereo borescope 10 is inserted through a first opening 91 in the wall structure 90 of the engine 80, the free end of said stereo borescope being illustrated in detail in FIG. 2.

The stereo borescope 10 is configured as a flexible borescope in which the actual shaft 11 is flexible and is pushed through a bent guide tube 12 through the combustion chamber 88 of the engine 80 and between the guide vanes 89 of the high-pressure turbine 87. In this case, the position of the stereo borescope 10 is crucially determined by the free end 13 of the guide tube 12, which can be controlled by the borescope guide device 14 secured to the exterior of the wall structure 90 of the engine 80. At the same time, the borescope guide device 14 supplies information about the position of the stereo borescope 10 vis-à-vis the turbine blades 87', said position being determinable on the basis of the data that can be read from the borescope guide device 14.

Two image capturing units 15, 16 spaced apart from one another are provided at the free end of the shaft 11 of the stereo borescope 10 and are directed at the same recording region in such a way that they record stereoscopic partial images. The image capturing units 15, 16 are CMOS or CCD sensors with a global or rolling shutter.

The stereo borescope 10 has an interface 17, via which the image data of the two image capturing units 15, 16 but also the information about the determinable position of the stereo borescope 10 can be communicated to a superordinate computer unit 20. Via said interface 17, the stereo borescope 10 can also receive control commands from the computer unit 20 in order, as necessary, to alter the position of the stereo borescope 10 with the aid of the borescope guide device 14.

Moreover, a further borescope 18 is also connected to the computer unit 20, which further borescope is inserted through a second opening 92 in the wall structure 90 of the engine 80 and by means of which further borescope the blades of the high-pressure compressor 85 can be observed. In the present case, the borescope 18 serves for ascertaining the rotation angle position of the blades of the high-pressure compressor 85, from which the rotation angle position of the blades 87' of the high-pressure turbine 87 can also be determined on account of the fixed connection of the high-pressure compressor 85 and of the high-pressure turbine 87 to the shaft 86. The blades 87' of the high-pressure turbine 87, on account of the prevailing loading there by the hot gases from the combustion chamber 88, regularly do not have an individualization feature that could be captured by the stereo borescope 10, by means of the high-pressure compressor 85, in which there is rather a corresponding possibility, and through accurate knowledge of the position of the two openings 91, 92 in the wall structure and of the position that is determinable by means of the borescope guide device 14, it is nevertheless possible to ascertain which of the turbine blades 87' of the first stage of the high-pressure turbine 87 is situated in the recording region of the stereo borescope 10.

Figure 3:
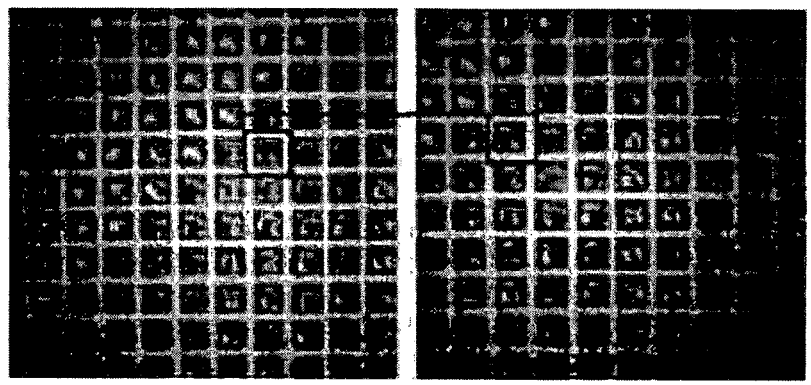
FIGS. 3a, 3b, and 3c show schematic illustrations of captured and processed image and 3D triangulation data.
Figure 3:
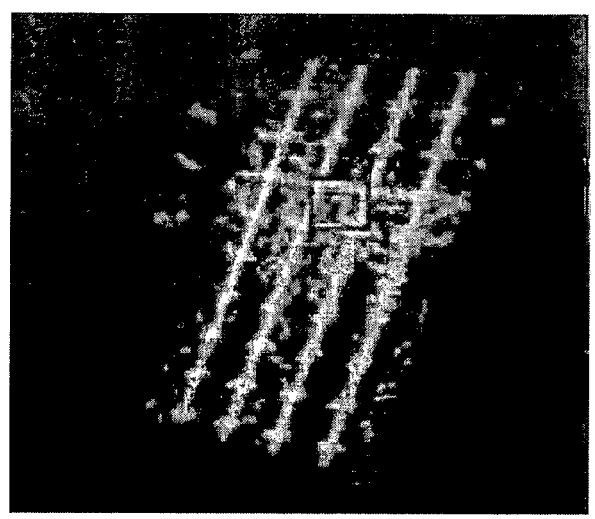
Figure 3:
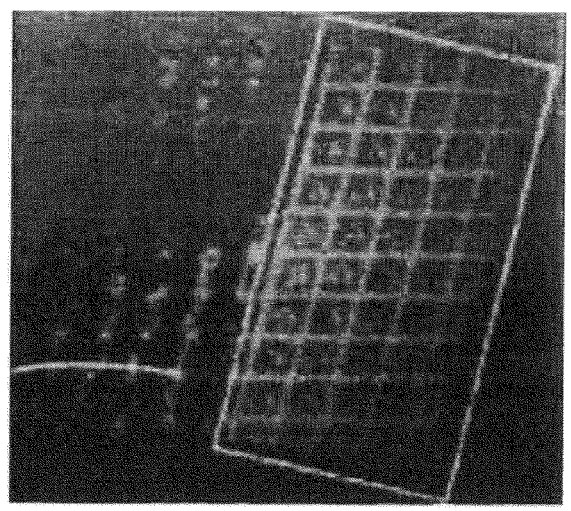

FIG. 3a illustrates by way of example two stereoscopic partial images recorded simultaneously by the image capturing units 15, 16 of the stereo borescope 10. By means of methods known by the name stereo vision, the two stereoscopic partial images—optionally after they have been rectified in order to correct possible angle errors or the like—can be combined by the computer units 20 to form 3D triangulation data, such as are indicated in FIG. 3b.

With the aid of these 3D triangulation data, which can provide information inter alia about the relative position of the image capturing units 15, 16 vis-à-vis the recorded object, a projection point 31 vis-à-vis a 3D CAD reference model 30 of the components to be recorded—here the turbine blades 87' of the first stage of the high-pressure turbine 78—is subsequently determined from the 3D triangulation data.

Figure 4:
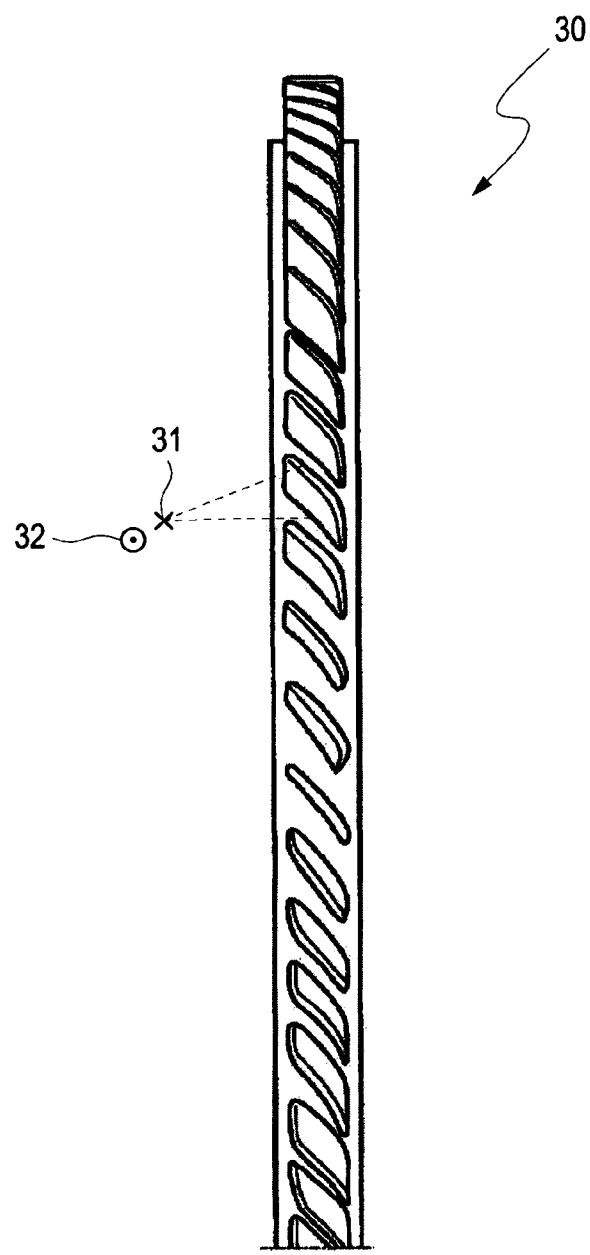
FIG. 4 shows a schematic illustration of a 3D CAD reference model of the turbine blades from FIG. 1.

A corresponding 3D CAD reference model 30 is shown schematically in FIG. 4. In this case, the 3D CAD reference model 30 comprises all turbine blades 87' of the first stage of the high-pressure turbine 87 and is based on the design drawings of the engine 80.

On account of the uniformity of the individual turbine blades 87', an unambiguous position of the projection point 31 cannot be determined solely on the basis of the 3D triangulation data. By means of the position—determinable by way of the borescope guide device 14—of the stereo borescope 10 in the interior of the engine 80, it is possible, however, together with the rotation angle position—determinable by way of the borescope 92—of the high-pressure turbine 87 and thus of the turbine blades 87', to determine an at least approximate position 32 of the image capturing units 15, 16 vis-à-vis the engine blades 87' and thus of the projection point 31 vis-à-vis the 3D CAD reference model 30. This approximate position 32 is used as a starting point for determining the actual position of the projection point 31, wherein it can then generally be assumed that the projection point 31 lies in the vicinity of the approximate position 32.

Proceeding from the projection point 31 determined in this way, the 3D triangulation data are used to adapt the 3D CAD reference model 30 to the actual conditions. In other words, the 3D CAD reference model 30 is thus varied in such a way that it corresponds as far as possible to the 3D triangulation data.

Afterward, 2D image data obtained from the stereoscopic partial images by superimposition are then projected onto the 3D CAD reference model 30 proceeding from the previously determined projection point 31, as a result of which said 3D CAD reference model is textured. The result is shown in FIG. 3c.

Particularly if successively so many recordings of the turbine blades 87' of the first stage of the high-pressure turbine have been created and, as described, transferred to the 3D CAD reference model 30 that a completely textured model of the entire turbine stage in question is present, an automated damage analysis can subsequently be carried out by image analysis and comparison of the actual structure captured with the original 3D CAD reference model 30. In this regard, on the basis of discolorations in the texture of the model, it is possible to ascertain small instances of damage and in particular cracks in individual turbine blades 87' while deviations from the original 3D CAD reference model 30 indicate deformations of individual turbine blades 87' which, if appropriate, should be examined more closely. By means of the described respective registration of the 3D triangulation data and the respective projection of the 2D image data onto that turbine blade of the 3D CAD reference model 30 which is actually situated in the recording region of the stereoscope 10, the possibly damaged turbine blades 87' can be determined unambiguously on the basis of the 3D CAD reference model 30.

Figure 5:
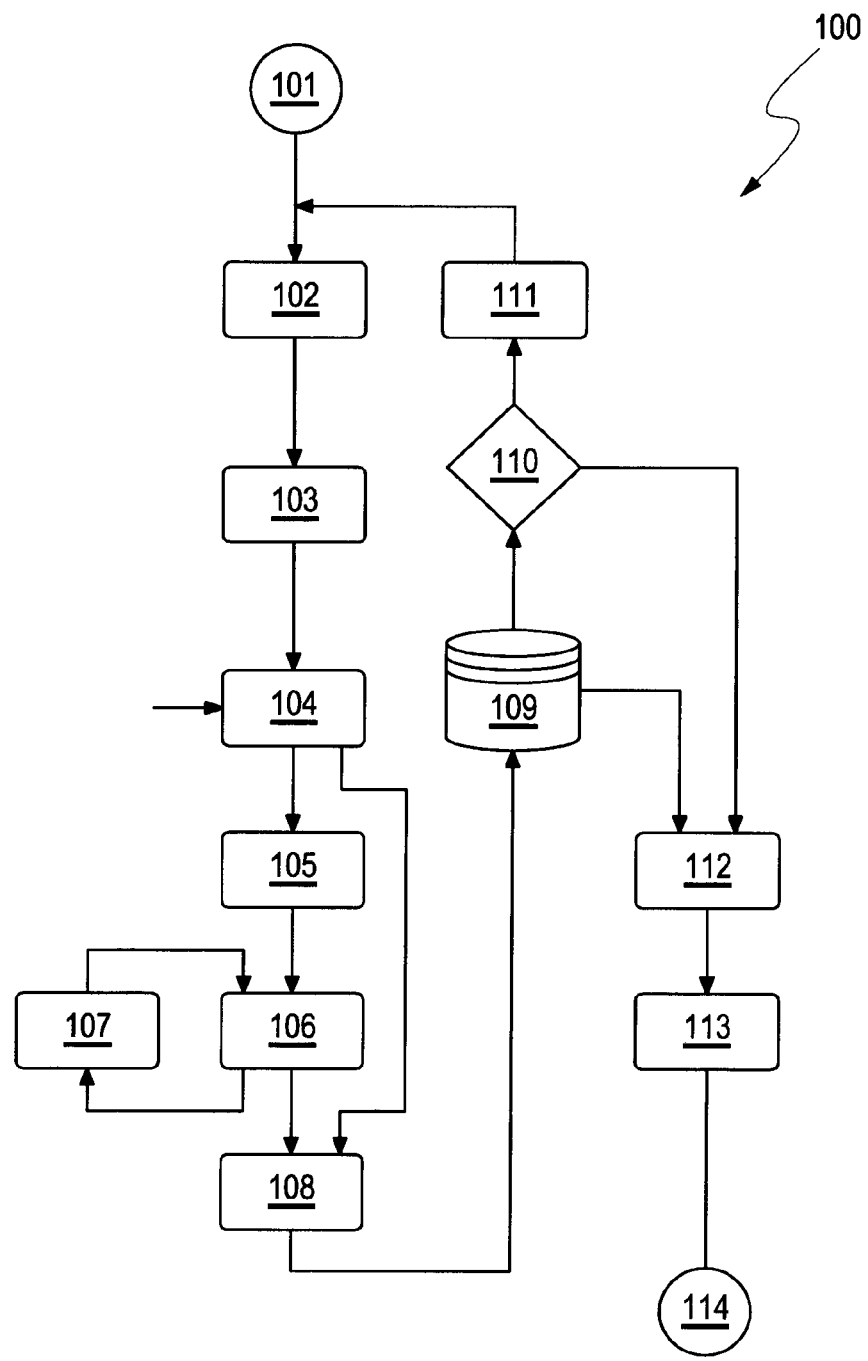
FIG. 5 shows a schematic illustration of a method according to the invention.

FIG. 5 illustrates a method sequence 100 as to how the turbine blades 87' of the first stage of the high-pressure turbine 87 of an aircraft engine 80, such as is illustrated by way of example in FIG. 1, can be captured and examined for damage in a completely automated manner.

At the start 101 of the method 100, it is assumed that a stereo borescope 10 that is controllable with regard to its position by means of a borescope guide device 14 has been inserted into the engine 80 and directed at one of the turbine blades 87' to be recorded. It is additionally assumed that besides the position of the stereo borescope 10 that is determinable by means of the borescope guide device 14, the rotation angle position of the turbine blades 87' of the first stage of the high-pressure turbine 87—e.g. with the aid of the second borescope 18—is also known.

In step 102, the stereoscopic partial images are generated by the stereo borescope 10. Afterward, the captured image data are communicated to the computer unit 20 (step 103). In the computer unit 20, the stereoscopic partial images are rectified with the aid of calibration data (step 104).

Afterward, 3D triangulation data are obtained from the stereoscopic partial images (step 105), and are registered to a 3D CAD reference model 30 (step 106). For this purpose—as explained above in association with FIG. 4—a projection point 31 is determined on the basis of the 3D triangulation data (step 107), wherein this determination, as indicated in FIG. 4, can be effected iteratively. After the 3D triangulation data have been registered and the projection point 31 has thus been determined, the 2D image data of the stereoscopic partial images captured in step 102 are projected onto the 3D CAD reference model 30 in step 108. The 3D CAD reference model 30 thus supplemented by a texture is stored in the memory (step 109).

Afterward, step 110 involves checking whether all desired regions of the turbine blades 87' of the first stage of the high-pressure turbine 87 have been captured, wherein a complete recording of all turbine blades 87' may also be desired. For this purpose, e.g. on the basis of the 3D CAD reference model 30 it is possible to check whether the regions in question are textured with 2D image data or whether 3D triangulation data are registered in the regions in question.

If not, the method involves alteration of the position of the stereo borescope 10 by means of the borescope guide device 14 and/or the rotation angle position of the turbine blades 87' (step 111) and steps 102 to 110 are repeated until the desired regions are completely captured.

If it is ascertained in step 110 that all desired regions are captured, a damage analysis are carried out in steps 112 and 113 on the basis of the 3D CAD reference model stored in the memory in step 109. For this purpose, in step 112 the 2D image data processed to form the texture of the 3D CAD reference model and—in step 113—the deviations of the 3D triangulation data from the original 3D CAD reference model are analyzed in order thus to determine possible damage.

The method ends in step 114 either with the indication of possible damage or with the notification that no damage has been found.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for borescope inspection of a component, wherein a stereo borescope is used for recording the component, the method comprising:
    generating two stereoscopic partial images by means of the stereo borescope;
    calculating 3D triangulation data from the two stereoscopic partial images;
    registering the 3D triangulation data to a 3D CAD reference model of the component captured by the stereo borescope, while determining a projection point;
    projecting 2D image data determined from the two stereoscopic partial images onto the 3D CAD reference model from the determined projection point; and
    determining damage by image analysis of the projected 2D image data and by ascertaining deviations of the registered 3D triangulation data vis-à-vis the 3D CAD reference model.

2. The method as claimed in claim 1, the method comprising:
    before calculating the 3D triangulation data, rectifying the two stereoscopic partial images on the basis of a predefined calibration.

3. The method as claimed in claim 1, the method comprising:
    adapting the 3D CAD reference model by the 3D triangulation data before the 2D image data are projected onto the 3D CAD reference model.

4. The method as claimed in claim 1,
    wherein the 2D image data are generated by superimposing the stereoscopic partial images.

5. The method as claimed in claim 1,
    wherein the projection point is determined beginning with a position of the stereo borescope that is determinable by a borescope guide device.

6. The method as claimed in claim 1,
    the method comprising:
    controlling a borescope guide device in such a way that all predefined regions of the component are captured sequentially by the stereo borescope, wherein the 3D triangulation data or the 2D image data generated in each case by way of the two stereoscopic partial images are combined with the aid of the 3D CAD reference model.

7. The method as claimed in claim 1,
    wherein the component to be recorded is blades of a gas turbine, wherein a rotation angle position of the blades to be recorded are taken into account when registering the 3D triangulation data to the 3D CAD reference model.

8. The method as claimed in claim 7,
    wherein the rotation angle position of the blades to be recorded is controlled in such a way that all blades of a turbine or compressor stage are captured.

9. A device for borescope inspection of a component, the device comprising:
    a stereo borescope; and
    a computer connected to the stereo borescope and having access to a memory comprising a 3D CAD reference model,
    wherein the device is configured to perform the method as claimed in claim 1.

10. The device as claimed in claim 9,
    the device comprising a borescope guide device configured to guide the stereo borescope, the borescope guide device being connected to the computer unit,
    wherein the device is configured such that:
        the projection point is determined beginning with a position of the stereo borescope that is determinable by a borescope guide device, or
        the borescope guide device is controlled in such a way that all predefined regions of the component are captured sequentially by the stereo borescope, the 3D triangulation data or the 2D image data being generated in each case by way of the two stereoscopic partial images that are combined with the aid of the 3D CAD reference model.

11. The device as claimed in claim 9,
    wherein
    the device is configured to determine and to take account of a rotation angle position of blades of a gas turbine, as the component to be recorded, and
    wherein the device is configured to either:
        take into account the rotation angle position when registering the 3D triangulation data to the 3D CAD reference model, or
        control the rotation angle position of the blades to be recorded in such a way that all blades of a turbine or compressor stage are captured.

* * * * *